US008651065B1

(12) United States Patent
Eash et al.

(10) Patent No.: US 8,651,065 B1
(45) Date of Patent: Feb. 18, 2014

(54) HEATED ANIMAL WATER TANK

(75) Inventors: Lloyd F. Eash, Shipshewana, IN (US); Allen Yoder, Centerville, MI (US)

(73) Assignee: Lloyd F. Eash, Shipshewanna, IN (US)

( * ) Notice: Subject to any disclaimer, the term of this patent is extended or adjusted under 35 U.S.C. 154(b) by 1030 days.

(21) Appl. No.: 12/699,609

(22) Filed: Feb. 3, 2010

(51) Int. Cl.
*F24H 1/06* (2006.01)

(52) U.S. Cl.
USPC .................. 122/233; 122/DIG. 10; 126/344; 126/373.1; 119/72; 119/73

(58) Field of Classification Search
USPC .......... 122/30, 233, DIG. 10; 126/344, 373.1, 126/376.1, 390.1, 391.1; 119/61.1, 61.52, 119/72, 73
See application file for complete search history.

(56) References Cited

U.S. PATENT DOCUMENTS

| | | | | |
|---|---|---|---|---|
| 1,397,766 A | * | 11/1921 | Lidberg ........................ | 392/447 |
| 4,893,609 A | * | 1/1990 | Giordani et al. ............. | 122/18.4 |
| 4,996,970 A | * | 3/1991 | Legare .......................... | 126/205 |
| 5,005,524 A | * | 4/1991 | Berry .......................... | 119/51.11 |
| 5,146,911 A | * | 9/1992 | Adams ......................... | 122/17.1 |
| 5,167,216 A | * | 12/1992 | Yeung et al. .................. | 126/349 |
| 5,231,953 A | * | 8/1993 | Garrett ........................ | 119/61.52 |
| 7,100,599 B2 | * | 9/2006 | Babington ................. | 126/376.1 |
| 8,146,535 B1 | * | 4/2012 | Neumann ...................... | 119/73 |
| 2007/0227456 A1 | * | 10/2007 | Borey ........................ | 119/61.52 |

* cited by examiner

*Primary Examiner* — Gregory A Wilson

(74) *Attorney, Agent, or Firm* — Botkin & Hall, LLP

(57) ABSTRACT

An animal water tank that is heated to prevent freezing. The tank has a bottom with at least one upwardly extending sidewall to define sides of the tank. A tunnel defining a watertight channel extends across the tank. The tunnel has a top, sides, and a bottom. Ends of the tunnel terminate at openings in sides of the tank. A burner assembly in the tunnel produces heat from a combustible fuel to heat the tunnel. Openings in sides of the tank are covered by fin plates having fins obliquely angled downward to form louvered openings. Access panels cover the fin plates and extend vertically up the sidewalls of the tank to form chimneys that allow combustion gasses from the burner to draft upwardly out of the tank. Insulation may be added to sides of the tank to retain heat in the water.

10 Claims, 4 Drawing Sheets

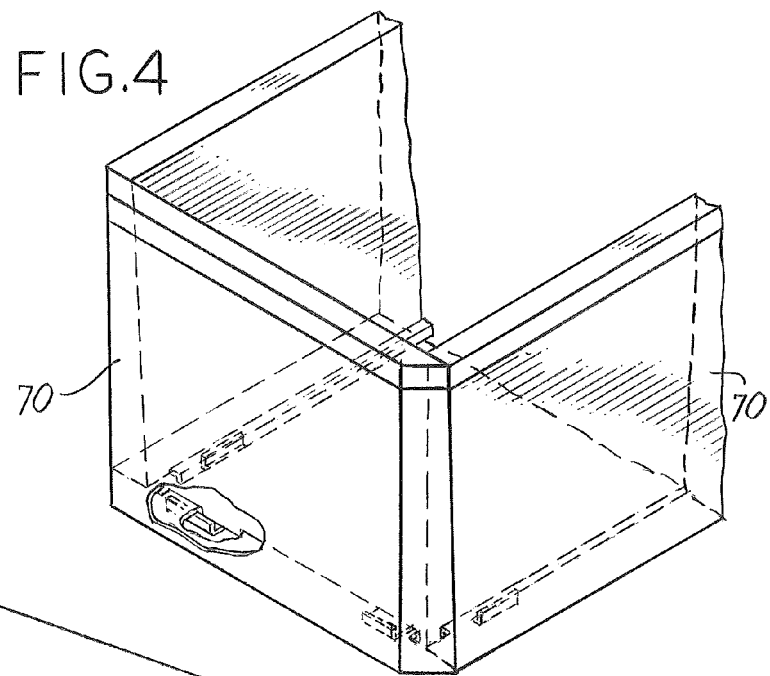
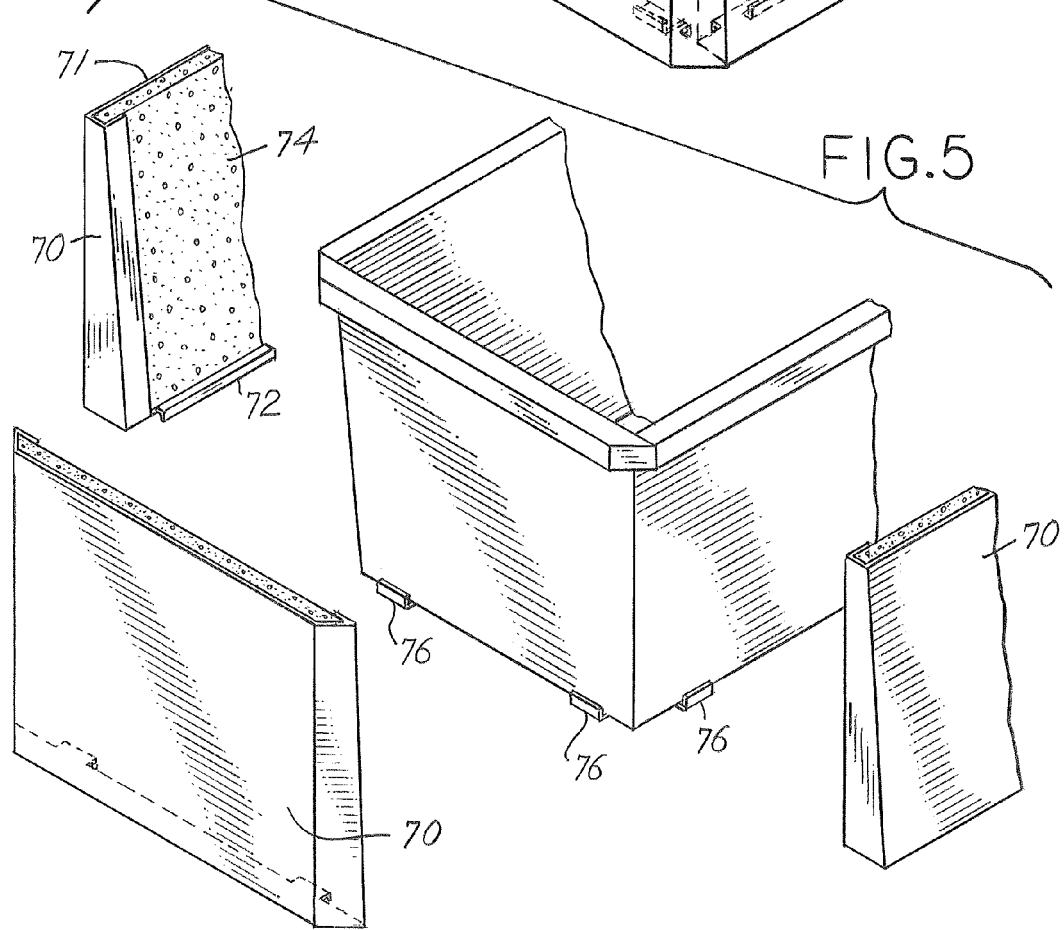

HEATED ANIMAL WATER TANK

In northern climates, animals kept outdoors during winter months may have difficulty getting drinking water due to freezing temperatures turning their water source into ice. To avoid having their water freeze, the water needs to be heated if kept outside in freezing temperatures. A simple way to keep animals' water warm is to use a simple resistive electrical heater to maintain the water at a certain predetermined temperature above freezing. While this does effectively prevent the water from freezing, the cost of providing the amount of electricity necessary to prevent freezing can be significant. Another drawback of using electricity to supply heat to water is that in a large pasture, an electrical outlet may be far from the animals' water tank. In a large agricultural operation, this may limit possible locations for water tanks in winter to places within an extension cord's reach of an electrical outlet.

SUMMARY OF THE INVENTION

The present invention is related to an animal water tank that is heated to prevent freezing. The tank has a bottom with at least one upwardly extending sidewall to define sides of the tank. A tunnel defining a watertight channel extends across the tank. The tunnel has a top, sides and a bottom. Ends of the tunnel terminate at openings in sides of the tank. A burner assembly in the tunnel produces heat from a combustible fuel to heat the tunnel.

The openings in the sides of the tank may be covered by fin plates having fins that form louvered openings within the fin plate. In this case, the fins are obliquely angled downward.

In another aspect of the invention, the fin plates are covered by removably secured access covers secured to the sides of the tank. The access covers have an outer wall that faces away from the tank, lateral walls, and a bottom wall extending toward the tank to form a hollow chimney with an open top defined by walls of the access cover and the side of the tank. The chimney allows combustion gasses to draft vertically through the chimneys. Seals may be included to prevent leakage of air between the lateral walls of the chimney and the sides of the tank.

The tank of the present invention is capable of holding insulation panels adjacent to the sides of the tank to prevent the loss of heat from the water contained in the tank.

BRIEF DESCRIPTION OF THE DRAWINGS

FIG. 1A is a sectional view taken about the line 1A-1A in FIG. 1;

FIG. 1B is a sectional view taken about the line 1B-1B in FIG. 1;

FIG. 4 is a perspective end view of the animal watering tank showing the insulation panels installed; and FIG. 5 is an exploded perspective end view of the animal watering tank showing the insulation panels removed from the tank.

DETAILED DESCRIPTION OF THE PREFERRED EMBODIMENT

Figure 1:
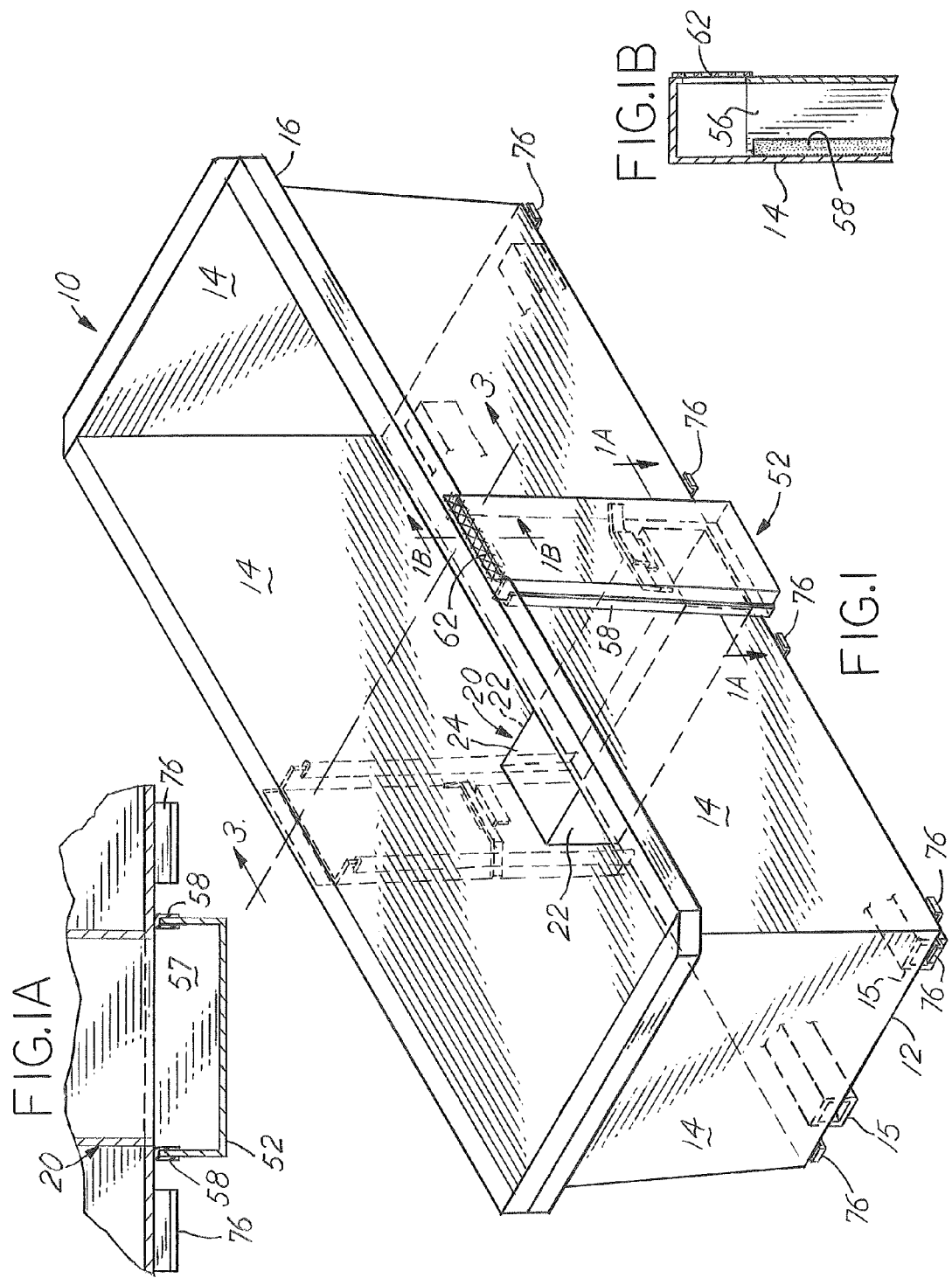
FIG. 1 is a perspective view of the animal water tank.
Figure 2:
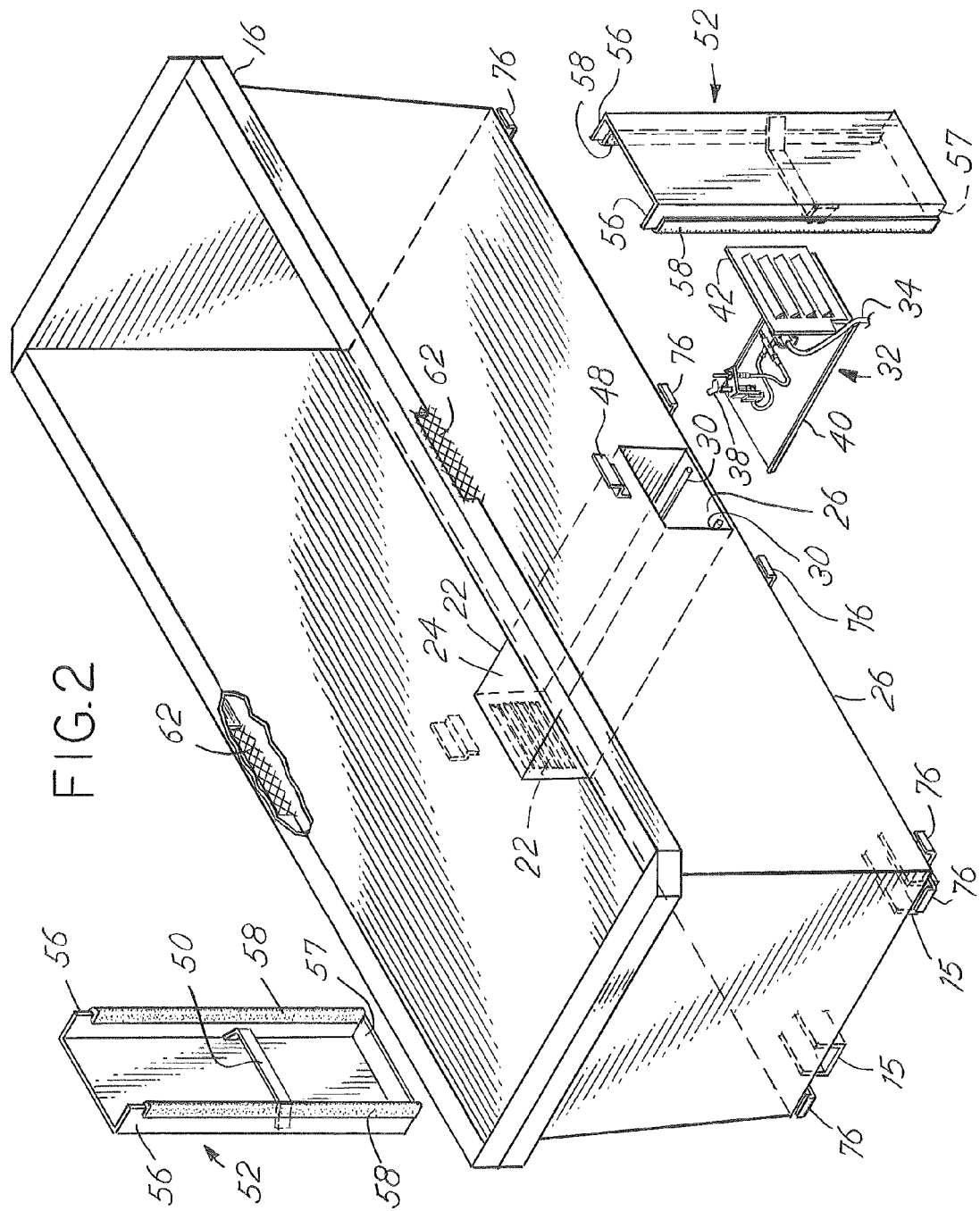
FIG. 2 is an exploded perspective view of the animal watering tank shown in FIG. 1.
Figure 3:
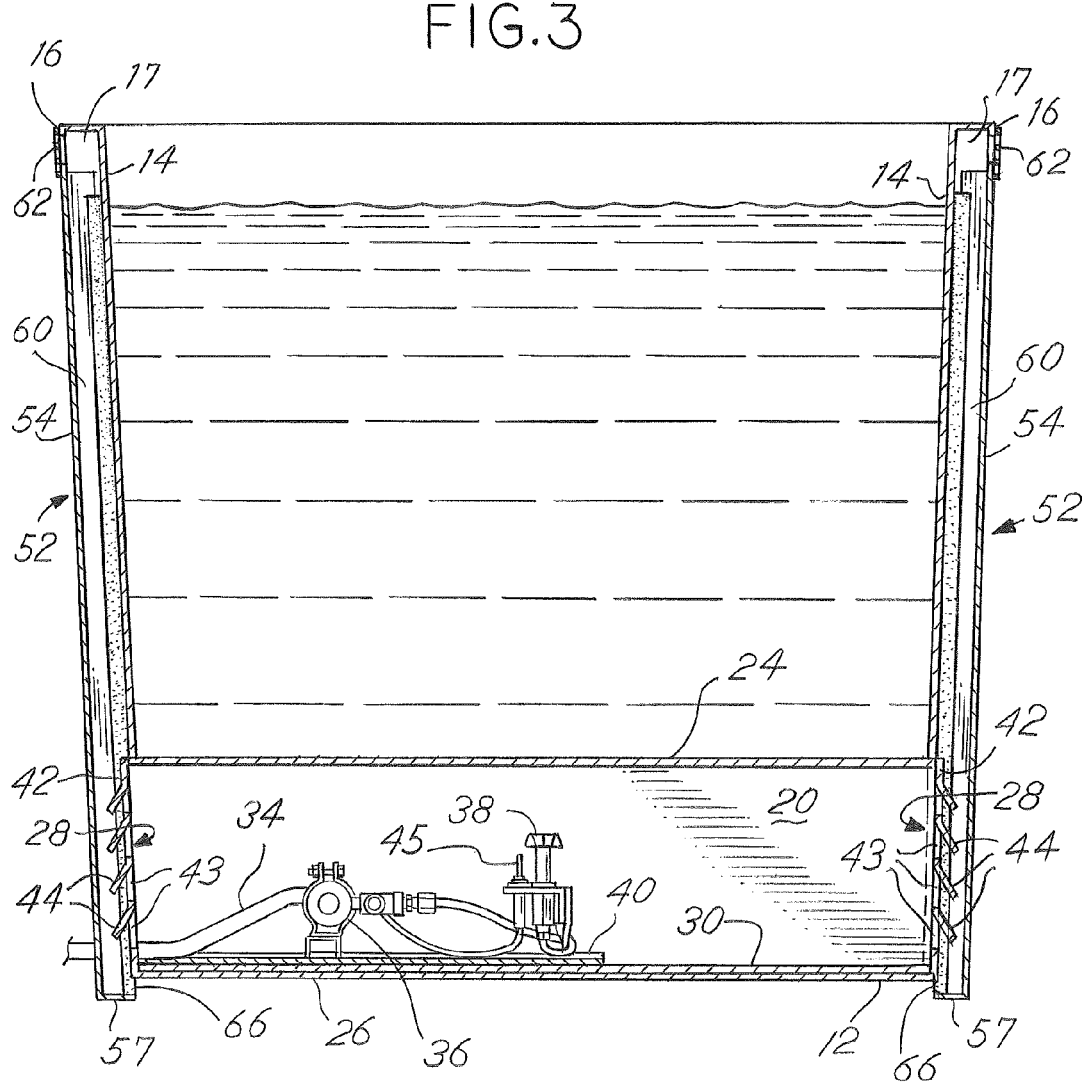
FIG. 3 is a sectional view of the animal watering tank taken about the line 3-3 in FIG. 1.

The present invention is a heated animal water tank 10 particularly useful in freezing winter conditions to prevent livestock water from becoming frozen. The water tank 10 has a bottom 12 and opposite sidewalls 14 extending upward from the bottom 12. The tank 10 shown in the FIGS. is a rectangular tank 10, however, it is contemplated a round or oval tank could be made of similar construction and would not necessarily have four distinct sidewalls. The bottom 12 and sidewalls 14 are steel that is welded together. Risers 15 that may be made from tube stock or C-channel extrusions are welded to the bottom and raise the entire tank 10 off the ground. The sidewalls 14 terminate in a lip 16 that defines a channel 17 beneath the top of the sidewalls 14. A tunnel 20 having sides 22, a top 24 and a bottom 26 spans across the inside of the tank 10 along the bottom 12 of the tank 10. The tunnel 20 has ends that terminate in openings 28 in opposing sidewalls 14 of the tank 10 as shown in FIGS. 1-3. Along the bottom 12 inside the tunnel 20 are a pair of round rods 30 running the length of the tunnel 20 and welded to the bottom 12.

A burner assembly 32 is placed in the tunnel 20 on the rods 30 running along the bottom 12 of the tunnel 20. The burner assembly 32 is slid in from the left side as shown in FIG. 3. The burner assembly 32 has a hose 34 that connects it to a supply of gas, which is typically liquid propane (LP) or could also be natural gas. The hose 34 enters a control valve 36 that allows a user to select the amount of gas delivered to a burner head 38 to control the intensity of the flame emitted from the burner head 38. The burner head 38 and control valve 36 are mounted on a mounting plate 40 of the burner assembly 32. On the left end of the mounting plate 40 is a fin plate 42 that fits within the tunnel opening 28 on the left side as shown in FIG. 3. The fin plate 42 has a series of fins 44 that are obliquely angled downward and provide a series of louvered openings 43 within the fin plate 42. As is typically done with gas appliances, a thermocouple 45 is placed near the burner head 38 to prevent the flow of gas to the burner head 38 if the flame at the burner head 38 became extinguished. The burner head 38 is biased toward the right side of the mounting plate 40 so that when the mounting plate 40 is inserted into the tunnel, the burner head 38 will project its flame onto the side 22 inside the tunnel 20. The right end of the tunnel 20 as shown in FIG. 3 includes a fin plate 42 that is not on the mounting plate 40, but is welded into the opening 28 on the right side of the tunnel 20.

The sidewalls 14 have catch flanges 48 located above the openings 28 for receiving a mounting bracket 50 of an access cover 52. Each access cover 52 extends vertically along a sidewall 14 of the tank 10 as shown in FIG. 3 when it is placed in its corresponding opening 28. Each access cover has an outer wall 54 that faces away from the sidewall 14 of the tank, a pair of lateral walls 56 and a bottom wall 57 that extend toward the tank. The lateral walls 56 receive seals 58 that are pressed against the sidewall 14 when the access cover 52 is installed and the seals 58 prevent air from entering behind the access cover 52 when it is on the tank 10. In their installed position, the access covers 52 form a chimney 60 defined by the lateral walls 56, the outside wall 54 and the sidewall 14 of the tank 10. As can be seen in FIG. 3, the bottom wall 57 of the access cover is below the bottom 12 of the tank. The risers 15 permit the bottom wall 57 to be beneath the tank without touching the ground surface.

The design of the tank 10 is configured to prevent the flame on the burner head 38 from becoming extinguished after being lit. This is accomplished by allowing air to be easily drawn in by the natural draft induced by combustion occurring at the burner head 38, and by preventing wind from forcing too much air across the small flame at the burner head 38 that would extinguish the flame. The chimneys 60 extending upwardly from the bottom 12 of the tank 10 to the channel 17 at the top of the tank 10 provide a means for combustion gasses to rise and escape from the tunnel 20. Air for combustion is drawn in through the gap 66 between the bottom wall 57 of the access cover 52 and the bottom 12 of the tank. The air enters easily through the openings 43 in the fin plates 42 to reach the burner head 38. As the gas fuel is burned, the combustion gasses rise and flow along the top 24 of the tunnel 20 exiting upper openings 43 in the fin plates 42, then rising up the chimneys 60. Screens 62 at the top of the chimneys 60 in the lip 16 prevent debris or animals from entering the chimneys so the chimneys 60 do not become clogged and smother the flame. Since the hot combustion gasses rise along the top 24 of the tunnel, a maximum amount of heat is transferred into the water contained within the tank 10.

The chimneys 60 and fin plates 42 prevent wind from directly entering the tunnel 20 to extinguish the flame. If wind were to blow across the tank 10 in a direction from the left in FIG. 3 to the right side of FIG. 3 this would tend to force air down the chimney 60 on the left side of the tank 10. As air is forced downward, it would enter through the screen 62 and move downward past the fin plate 42. The fins 44 shield the openings 43 from accepting a downward blast of air that could extinguish the flame. The air rushing past the fins 44 exits the open gap 66 between the bottom 12 of the tank 10 and the bottom wall 57 of the access cover 52. The chimney 60 on the right side would not have air being forced down it and would allow the gasses from combustion to rise and exit through the screen 62 at the top of that chimney 60. Thus, no matter which way the wind is blowing, the gasses from combustion will be able to exit the tank 10.

Optional insulation panels 70 may be installed on the tank 10. The insulation panels 70 have an outer metal shell 71 with a lower flange 72 that surrounds an insulation layer 74. Extruded polystyrene is a suitable material for the insulation layer 74, but insulation materials may be used as well. The outer metal shell 71 protects the softer insulation layer 74 from being damaged by animals using the tank 10. L-shaped flanges 76 extend from the bottom 12 of the tank to receive the lower flange 72 of each insulation panel 70. Installation of the insulation panels 70 is accomplished by lifting the upper end of each panel into the channel 17 defined by the lip 16 and then placing the lower flange 72 of each insulation panel 70 into the corresponding L-shaped flanges 76.

When a user of the tank 10 determines it is necessary to protect his livestock's water from becoming frozen, he will remove the access cover 52 on the left side of the tank 10, as shown in FIG. 3, and slide out the burner assembly 32. Typically, the burner assembly will be connected to an LP tank (not shown) near the water tank 10. The user will then light the burner head 38 and slide the burner assembly 32 into the tunnel 20. The round rods 30 on the bottom 26 of the tunnel 20 prevent condensation from freezing the burner assembly 32 to the bottom 26 of the tunnel 20. The access cover 52 will then be installed over the opening 28 at the end of the tunnel 20 by lifting it upward and then sliding the cover 52 downward until the bracket 50 rests on the catch flange 48. Depending on the outside temperature, the user will select the lowest setting on the control valve 36 that keeps the water unfrozen. The insulation panels 70 will typically be in place during the coldest months of the year so that heat put into the water is retained, which reduces the usage of gas needed to fuel the burner head 38.

The invention is not limited to the details given above, but may be modified within the scope of the following claims.

What is claimed is:

1. A heated water tank comprising:
a bottom having at least one upwardly extending sidewall to define sides of said tank;
a tunnel defining a watertight channel extending across said tank, said tunnel having a top, sides and a bottom and ends, said ends terminating at openings in said sides of said tank, said openings in said sides of said tank are covered by fin plates, each said fin plate includes a plurality of fins being obliquely angled downward to form a louvered opening within said fin plate;
said openings and fin plates are covered by removably secured access covers secured to said sides of said tank, said access covers having an outer wall facing away from said tank, lateral walls and a bottom wall extending toward said tank to form a hollow chimney with an open top defined by walls of said access cover and said side of said tank for allowing combustion gasses to draft vertically through said chimneys and;
a burner assembly contained within said tunnel for producing heat from a combustible fuel to heat said tunnel.

2. A heated water tank as claimed in claim 1, wherein said lateral walls of said access cover include a seal to contact said side of said tank to prevent leakage of air between said lateral walls and said side of said tank.

3. A heated water tank as claimed in claim 1, wherein said sidewall terminates in a channel, said top of said chimney being retained within said channel.

4. A heated water tank as claimed in claim 1, wherein said bottom of said chimney is open to ambient air.

5. A heated water tank as claimed in claim 4, wherein said channel includes a screen above said chimney.

6. A heated water tank as claimed in claim 1, wherein said sides of said tank are capable of receiving insulation panels.

7. A heated water tank comprising:
a bottom having upwardly extending sidewalls to define an interior capable of retaining water;
a tunnel defining a watertight channel extending between opposing sidewalls across the interior of said tank, said tunnel having a top, sides and a bottom, said tunnel terminating at openings in said opposing sidewalls and said tunnel being open to ambient air at both ends, openings are covered by fin plates, each said fin plate includes a plurality of fins being obliquely angled downward to form a louvered opening within said fin plate; and
a burner assembly contained within said tunnel for producing heat from a combustible fuel to heat said tunnel.

8. A heated water tank as claimed in claim 7, wherein said lateral walls of said access cover include a seal to contact said side of said tank to prevent leakage of air between said lateral walls and said side of said tank.

9. A heated water tank as claimed in claim 7, wherein said sidewall terminates in a channel, said top of said chimney being retained within said channel.

10. A heated water tank as claimed in claim 7, wherein said bottom of said chimney is open to ambient air.

* * * * *